(12) United States Patent
Kretschmann et al.

(10) Patent No.: US 11,618,458 B2
(45) Date of Patent: Apr. 4, 2023

(54) METHOD AND DEVICE FOR DETERMINING WHEEL LOADS ON WHEELS OF A VEHICLE

(71) Applicant: Continental Automotive GmbH, Hannover (DE)

(72) Inventors: Matthias Kretschmann, Wenzenbach (DE); Parthiv Dharamshi, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 720 days.

(21) Appl. No.: 16/611,097

(22) PCT Filed: May 2, 2018

(86) PCT No.: PCT/EP2018/061214
§ 371 (c)(1),
(2) Date: Nov. 5, 2019

(87) PCT Pub. No.: WO2018/202719
PCT Pub. Date: Nov. 8, 2018

(65) Prior Publication Data
US 2020/0156650 A1 May 21, 2020

(30) Foreign Application Priority Data
May 5, 2017 (DE) ..................... 10 2017 207 620.8

(51) Int. Cl.
*B60W 40/13* (2012.01)
*B60C 23/04* (2006.01)
(Continued)

(52) U.S. Cl.
CPC ............ *B60W 40/13* (2013.01); *B60C 23/04* (2013.01); *B60C 23/064* (2013.01); *B60W 40/12* (2013.01);
(Continued)

(58) Field of Classification Search
CPC ................. B60W 40/13; B60W 40/12; B60W 2040/1307; B60W 2520/105;
(Continued)

(56) References Cited

U.S. PATENT DOCUMENTS 6,064,931 A * 5/2000 Sawada ................... B60T 8/172
73/11.01
9,752,962 B2 * 9/2017 Singh ...................... B60T 8/172
(Continued)

FOREIGN PATENT DOCUMENTS

DE        10329700 A1       1/2005
DE      102006033951 A1    10/2007
(Continued)

OTHER PUBLICATIONS

Office Action dated Jan. 23, 2018 from corresponding German Patent Application No. DE 10 2017 207 620.8.
(Continued)

*Primary Examiner* — James M McPherson
*Assistant Examiner* — Kyle J Kingsland

(57) ABSTRACT

A method and a device for determining loads on vehicle's wheels, each with a tire, is disclosed. A deformation measured value and a pressure measured value for each tire, and at least one acceleration measured value for the vehicle are detected. For the respective wheels, dynamic wheel loads are calculated according to a first model and static wheel loads are calculated according to a second model. The second model comprises at least one model parameter calculated by statistical analysis of the calculated dynamic wheel loads, the calculated static wheel loads, and the detected at least one acceleration measured value. The at least one acceleration measured value is redetected and the dynamic wheel loads are recalculated from the previously calculated static wheel loads and the at least one detected
(Continued)

Figure 1:
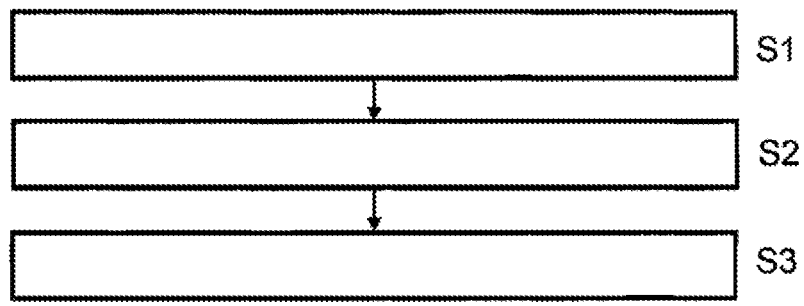

acceleration measured value according to the second model using the previously calculated at least one model parameter of the second model.

15 Claims, 4 Drawing Sheets

(51) Int. Cl.
*B60C 23/06* (2006.01)
*G01G 19/12* (2006.01)
*G01M 1/32* (2006.01)
*G01M 17/02* (2006.01)
*B60W 40/12* (2012.01)

(52) U.S. Cl.
CPC ............ *G01G 19/12* (2013.01); *G01M 1/326* (2013.01); *G01M 17/02* (2013.01); *B60W 2040/1307* (2013.01); *B60W 2520/105* (2013.01); *B60W 2520/125* (2013.01)

(58) Field of Classification Search
CPC ............ B60W 2520/125; B60C 23/04; B60C 23/064; G01G 19/12; G01G 1/326; G01G 17/02
See application file for complete search history.

(56) References Cited

U.S. PATENT DOCUMENTS

| 10,048,170 B2* | 8/2018 | Singh | G01L 5/00 |
| 2014/0278040 A1* | 9/2014 | Singh | G01G 19/086 701/124 |

FOREIGN PATENT DOCUMENTS

| DE | 102007023069 A1 | 11/2008 |
| DE | 102008046269 B3 | 12/2009 |
| DE | 102009005904 A1 | 7/2010 |
| DE | 102009057578 A1 | 6/2011 |
| DE | 102015206220 A1 | 10/2016 |
| EP | 2705963 A2 | 3/2014 |
| GB | 2533658 A | 6/2016 |

OTHER PUBLICATIONS

International Search Report and Written Opinion dated Jul. 27, 2018 from corresponding International Patent Application No. PCT/EP2018/061214.

* cited by examiner

METHOD AND DEVICE FOR DETERMINING WHEEL LOADS ON WHEELS OF A VEHICLE

The present invention relates to the determination of wheel loads on wheels, which are equipped with tires, of a vehicle, in particular to a method and to a device for determining dynamic wheel loads on the wheels of a vehicle.

The term "dynamic wheel load" denotes here and below the wheel load which actually acts on the respective wheel and depends on the current driving state of the vehicle.

In modern motor vehicles it is known to determine the wheel load of a wheel on a vehicle while this vehicle is traveling by means of an electronic wheel unit arranged on the wheel. Such a method is described in DE 103 29 700 A1 and is based on the fact that there is a specific functional relationship between the wheel load, deformation of the tire and the internal pressure of the tire depending on the properties of the respective tire. By using this relationship it is therefore possible to determine the wheel load from a deformation measured value which is representative of the deformation of the tire, and from a pressure measured value which is representative of the internal pressure of the tire.

However, with such methods and devices it is in practice often not possible for a variety of reasons to determine the wheel load at every desired point in time and/or at very short time intervals, i.e. with high time resolution. A first reason is, for example, that reliable detection of the specified deformation measured value by means of an electronic wheel unit according to the known methods often requires a measuring time in which the respective wheel has carried out at least one revolution or even multiple revolutions. Therefore, e.g. a deformation measured value still cannot be determined directly after the start of travel of the vehicle. A further problem is that the specified electronic wheel units are usually battery-operated so that more frequent detection operations of the deformation measured values and/or pressure measured values, i.e. detection operations at short time intervals, could reduce the battery service life owing to the power consumption associated with said detection operations. If the specified measured values and/or data derived therefrom are communicated by the electronic wheel unit to a central control apparatus of the vehicle by radio, legal restrictions in respect of radio emissions prevent more frequent transmission of the measured values or data in many countries, in addition to the increased power consumption when there is more frequent transmission of radio signals. In practice, an electronic wheel unit therefore typically transmits a radio signal to the control apparatus of the vehicle only approximately every 10 sec. Furthermore, it is to be borne in mind that the measuring process, in particular for the deformation measured value, e.g. a length of one tire contact area, can be subjected to interference, for example owing to unevenness of the roadway, to such an extent that measured values are firstly subjected to filtering or the like, and a sufficiently reliable deformation measured value is therefore often only available after more than a minute. Such time periods are clearly too long to be able to map dynamic travel effects, for example cornering, avoidance manoeuvres, acceleration, braking, on the basis of this detection.

For these reasons, known wheel load-determining systems are often aimed from the outset at determining the static wheel loads by eliminating, i.e. rejecting, measured values which are influenced by dynamic travel effects, and using only uninfluenced measured values for the determination of the wheel loads. For example a longitudinal acceleration and a lateral acceleration of the vehicle can be measured for this in order to reject measured values obtained in unfavorable driving states and therefore to determine the wheel loads only in unaccelerated vehicle states, i.e. as static wheel loads.

The term "static wheel load" denotes here and in the text which follows the wheel load which acts on the respective wheel on the flat in the case of an unaccelerated vehicle, in particular e.g. in the case of a stationary vehicle.

The static wheel loads are, as it were, a property of the vehicle itself and result directly from the mass distribution of the vehicle in conjunction with the locations at which the wheels are arranged. When the vehicle is stationary, there is no difference between the static wheel loads and the dynamic wheel loads, whereas while the vehicle is traveling the dynamic wheel loads vary owing to dynamic effects, particular in the case of accelerations, decelerations (negative accelerations) and cornering.

It is to be noted that while the vehicle is traveling, particular also e.g. during acceleration, the individual static wheel loads the present, specifically as those wheel loads which would occur at the wheels if the vehicle were brought to a standstill on the flat without any change in the mass distribution (including the masses of the vehicle occupants or a cargo). In addition it is to be noted that the static wheel loads which are also defined during travel can change, specifically if the mass distribution of the vehicle changes, e.g. when vehicle occupants and/or some other cargo shift/shifts, whether in the stationary state or during travel.

It is an object of the present invention to specify a method and a device with which improved determination of, in particular, dynamic wheel loads is made possible on wheels, which are each equipped with a tire, of a vehicle.

This object is achieved according to the invention by a method as claimed in claim 1 and a device as claimed in claim 9. The further claims relate to advantageous developments of the invention.

A first aspect of the invention relates to a method for determining wheel loads on wheels, which are each equipped with a tire, of a vehicle, said method having the following steps:

a1) detecting deformation measured values which are representative of a deformation of the respective tire, a2) detecting pressure measured values which are representative of an internal pressure of the respective tire, a3) detecting at least one acceleration measured value which is representative of an acceleration of the vehicle, b) calculating dynamic wheel loads of the respective wheels from the respective detected deformation measured value and the respective detected pressure measured value according to a first model which links these variables, wherein the dynamic wheel load of a wheel represents the wheel load actually acting on this wheel, c) calculating static wheel loads of the wheels from the calculated dynamic wheel loads of the wheels and the at least one detected acceleration measured value according to a second model which links these variables and contains at least one model parameter, wherein the static wheel load of a wheel represents the wheel load acting on this wheel when the vehicle is not accelerated, and wherein the at least one model parameter of the second model is, for example, fixedly specified, d) calculating the at least one model parameter of the second model as result of a statistical analysis of the calculated dynamic wheel loads of the wheels, of the respectively calculated static wheel loads of the wheels, and of the respectively detected at least one acceleration measured value, e1) optionally renewed detection of deformation measured values which are representative of a deformation of the respective tire, e2) optionally renewed detection of pressure measured values which are representative of an internal pressure of the respective tire, e3) renewed detection of at least one acceleration measured value which is representative of an acceleration of the vehicle, f) renewed calculation of the dynamic wheel loads of the wheels from the previously calculated static wheel loads of the wheels and the at least one newly detected acceleration measured value according to the second model, wherein the previously calculated at least one model parameter of the second model is used.

In this method, in an initial or first phase, e.g. directly after start of travel of the vehicle, deformation measured values and pressure measured values can be detected together with at least one acceleration measured value (steps a1, a2, a3) in order to calculate dynamic wheel loads (step b) and also to calculate static wheel loads taking into account the at least one acceleration measured value (step c), which are therefore also advantageously available relatively quickly, like the dynamic wheel loads. After a statistical analysis (step d) has been carried out, the method makes it possible, in a later or second phase (steps e1, e2, e3, f), to advantageously determine the dynamic wheel loads with high time resolution, since the latter determination now decisively involves only more acceleration measured values which can be obtained with a high time resolution.

The steps of the method according to the invention are explained in more detail below, wherein more details are given on a number of particular embodiments and optional developments.

In step a1, in particular e.g. a length of a tire contact area of the respective tire can be detected as a deformation measured value. However, other variables which can be detected on the tire can also be considered insofar as they represent a quantitative measure of the tire deformation, such as e.g. a radial distance, measured in the region of the tire contact area, between a rim on which the tire is mounted, and an inner side of the tire contact area, or e.g. a degree of curvature of the curvature of the tire contact area at the front end and/or at the rear end of the tire contact area.

In step a2, the value of the internal pressure which is e.g. measured by means of a pressure sensor arranged inside the tire can be used as a pressure measured value in the simplest case. However, using a different qualitative measure of the internal pressure as a pressure measured value should not be ruled out.

In one preferred embodiment, steps a1 and a2 are carried out by means of an electronic wheel unit which is arranged on the respective wheel and is e.g. battery-operated and which has suitable sensor apparatuses for detecting the two measured values.

In order to detect the deformation measured value (step a1), e.g. an acceleration sensor of the electronic wheel unit can be used whose time-dependent sensor signal exhibits specific signal characteristics at each pass through the tire contact area on a rotating wheel, from which characteristics the deformation measured value can be determined, including e.g. the already specified length of the tire contact area.

In step a3, in particular e.g. a longitudinal acceleration measured value which is representative of a longitudinal acceleration of the vehicle can be provided as an acceleration measured value.

Alternatively or additionally, in the step a3, e.g. a lateral acceleration measured value which is representative of a lateral acceleration of the vehicle can also be detected.

Preferably, both the longitudinal acceleration measured value and the lateral acceleration measured value or alternatively another pair of non-parallel horizontal accelerations of the vehicle are detected, so that the detection in step a3 makes available at least the vectorial horizontal acceleration of the vehicle.

The acceleration measured value or values can expediently be made available by a sensor apparatus which is arranged on the vehicle.

However, it should not be ruled out that the at least one acceleration measured value is made available by the already mentioned electronic wheel unit on the respective wheel. Therefore, e.g. a measured value which is representative of the lateral acceleration of the vehicle could be detected by means of a lateral acceleration sensor arranged in the electronic wheel unit. A measured value which is representative of the longitudinal acceleration of the vehicle can be detected e.g. using an acceleration sensor, e.g. a radial acceleration sensor, arranged in the electronic wheel unit. Although such a sensor does not directly measure the longitudinal acceleration of the vehicle but rather e.g. a radial acceleration or e.g. a tangential acceleration of the wheel, which are each to be considered in conjunction with the acceleration due to gravity, the longitudinal acceleration can be determined by evaluating the time-dependent sensor signal, since, assuming slip-free rolling of the wheel, a longitudinal acceleration also signifies a corresponding change in the rotational speed of the wheel over time, which change can in turn be obtained by evaluating the acceleration, e.g. the radial acceleration, measured at the wheel.

When carrying out steps a1, a2, a3 there can be provision that in each case a measured value tuple having at least one deformation measured value, one pressure measured value and at least one acceleration measured value is therefore detected for a respective tire and a respective detection time, wherein, when considered for a specific tire, the specified three elements of the tuple can e.g. be detected simultaneously. Alternatively, when detecting the three measured values at not precisely identical points in time it is possible e.g. to obtain the specified tuple by means of corresponding interpolation.

In step b, the dynamic wheel load of a specific wheel can be calculated as soon as a deformation measured value and an associated pressure measured value have been detected for the tire (steps a1, a2).

The result of step a3 is not required for step b. The latter is required in step c.

The first model which is required in step b may have been determined e.g. for the respective tire or tire type in advance in an empirical fashion, for example by measuring the deformation of an example of the respective tire type on a test bench under controlled variation of the wheel load and internal pressure, which permits a corresponding deformation measured value to be obtained.

Within the scope of the invention there can be provision that the first model is defined and/or modified on the basis of stored tire type data. Such tire type data can be stored e.g. in the specified electronic wheel unit. Storage can carried out e.g. by means of workshop personnel after mounting of a tire or wheel on the vehicle.

If for example the length of the tire contact area of the tire is measured in a1, and the internal pressure of the tire is measured in a2, the first model can be provided e.g. as follows:

$$LD = p \times B \times L$$

where:
LD Dynamic wheel load
P Internal pressure
B Width of the tire contact area
L Length of the tire contact area If the width B of the tire contact area is not detected as a further deformation measured value, in this model this width B can be assumed e.g. in an approximated fashion as a constant or as a model parameter which is dependent on the tire type, and/or as a function of the value of the length L. In order to refine the first model which is formulated above, e.g. the influence of a rigidity of the tire could also be taken into account therein.

In one embodiment there is provision that step b is carried out by an electronic control apparatus which is arranged on the vehicle and which is supplied the measured values, required for this, of suitable detection or sensor apparatuses.

If steps a1, a2 are carried out by means of electronic wheel units on the respective wheels, the measured values which are detected here are transmitted e.g. by radio to such an electronic control apparatus of the vehicle, e.g. a central control unit.

Alternatively, step b is carried out by an electronic wheel unit which is arranged on the respective wheel and which expediently also carries out steps a1, a2 in this case. A result of step b which is carried out by an electronic wheel unit (dynamic wheel load of the respective wheel) is preferably transferred to an electronic control apparatus of the vehicle by radio, as an alternative to or in addition to the measured values on which the calculation is based.

In step c, a second model is used to calculate the static wheel loads of the wheels from the dynamic wheel loads of the wheels which are respectively calculated for a specific point in time (step b) and the at least one acceleration measured value detected for this point in time (step a3).

The second model and/or the at least one model parameter thereof may have been determined e.g. for the respective vehicle or the respective vehicle type in advance in an empirical fashion, and stored in an electronic control apparatus, e.g. in the form of model parameters or having model parameters, which carries out step c.

Alternatively, the second model may also have been determined in advance on the basis of mathematical-physical considerations, which also applies to the first model already mentioned above.

Apart from the selection of the at least one acceleration measured value, in particular the mass distribution of the vehicle and the number and arrangement of the wheels of the vehicle are significant for the specific configuration of the second model. Furthermore, in the second model it is also possible to take into account a characteristic of a spring damping system of the vehicle which includes e.g. spring dampers on suspension elements of the wheels.

For the case of a vehicle with four wheels (front left, front right, rear right, rear left), the second model can be formulated e.g. as follows:

$$LDFL = f1(L0FL, L0FR, L0RR, L0RL, ax, ay)$$

$$LDFR = f2(L0FL, L0FR, L0RR, L0RL, ax, ay)$$

$$LDRR = f3(L0FL, L0FR, L0RR, L0RL, ax, ay)$$

$$LDRL = f4(L0FL, L0FR, L0RR, L0RL, ax, ay)$$

where:
LDFL denotes the dynamic wheel load on the front left wheel
LDFR denotes the dynamic wheel load on the front right wheel
LDRR denotes the dynamic wheel load on the rear right wheel
LDRL denotes the dynamic wheel load on the rear left wheel
L0FL denotes the static wheel load on the front left wheel
L0FR denotes the static wheel load on the front right wheel
L0RR denotes the static wheel load on the rear right wheel
L0RL denotes the static wheel load on the rear left wheel
ax denotes the longitudinal acceleration of the vehicle
ay denotes the lateral acceleration of the vehicle
f1 denotes a mathematical function
f2 denotes a mathematical function
f3 denotes a mathematical function
f4 denotes a mathematical function The mathematical functions f1 to f4 can be determined empirically for the respective vehicle type and in the above representation they respectively supply the dynamic wheel load of a specific wheel as a function of the static wheel loads of all the wheels and the longitudinal and lateral accelerations of the vehicle. For the application of the second model in step c this can also be equivalently represented as follows:

$$L0FL = g1(LDFL, LDFR, LDRR, LDRL, ax, ay)$$

$$L0FR = g2(LDFL, LDFR, LDRR, LDRL, ax, ay)$$

$$L0RR = g3(LDFL, LDFR, LDRR, LDRL, ax, ay)$$

$$L0RL = g4(LDFL, LDFR, LDRR, LDRL, ax, ay)$$

wherein in this presentation g1 to g4 denote mathematical functions which each provide the static wheel load of a specific wheel as a function of the dynamic wheel loads of all the wheels and of the longitudinal and lateral accelerations of the vehicle.

In particular, when a second model such as described above is used, i.e. a model in which the static wheel load of a specific wheel also depends on dynamic wheel loads of one or more of the other wheels, it is expedient that step c is carried out by an electronic control apparatus of the vehicle to which for this purpose is made available all the data required to calculate the static wheel loads of the wheels.

Within the scope of this making available process there can be provision e.g. that step b is carried out for each of the wheels by a respective electronic wheel unit on the respective wheel, and the result, therefore the calculated dynamic wheel load of this wheel, is transferred by radio to the specified control apparatus of the vehicle.

Alternatively or additionally there can be provision that the electronic wheel units which are arranged on the wheels each transfer the result of the execution of steps a1, a2 and, if appropriate a3, by radio to the control apparatus of the vehicle, which apparatus then carries out steps b and c for all the wheels on the basis of this transferred information.

In one development of the above embodiment there is provision that the second model is provided in a simplified form as follows:

$$LDFL = f1(L0FL, ax, ay)$$

$$LDFR = f2(L0FR, ax, ay)$$

$$LDRR = f3(L0RR, ax, ay)$$

$$LDRL = f4(L0RL, ax, ay)$$

In this development, the mathematical functions f1 to f4 each supply the dynamic wheel load of a specific wheel as a function of the static wheel load of the same wheel and the longitudinal and lateral accelerations of the vehicle.

In another, more specific development there is provision that the second model is provided in a more concrete form (linearized) as follows:

$$LDFL = L0FL + c1FL \times ax + c2FL \times ay$$

$$LDFR = L0FR + c1FR \times ax + c2FR \times ay$$

$$LDRR = L0RR + c1RR \times ax + c2RR \times ay$$

$$LDRL = L0RL + c1RL \times ax + c2RL \times ay$$

where:
LDFL denotes the dynamic wheel load on the front left wheel
LDFR denotes the dynamic wheel load on the front right wheel
LDRR denotes the dynamic wheel load on the rear right wheel
LDRL denotes the dynamic wheel load on the rear left wheel
L0FL denotes the static wheel load on the front left wheel
L0FR denotes the static wheel load on the front right wheel
L0RR denotes the static wheel load on the rear right wheel
L0RL denotes the static wheel load on the rear left wheel
c1FL denotes a model parameter
c1FR denotes a model parameter
c1RR denotes a model parameter
c1RL denotes a model parameter
c2FL denotes a model parameter
c2FR denotes a model parameter
c2RR denotes a model parameter
c2RL denotes a model parameter
ax denotes the longitudinal acceleration of the vehicle
ay denotes the lateral acceleration of the vehicle The simplification which is provided in this second model consists, on the one hand, on the fact that the dynamic wheel load of a specific wheel is calculated only as a function of the static wheel load of the same wheel and of the longitudinal and lateral accelerations of the vehicle or that the static wheel load of a specific wheel is calculated only as a function of the dynamic wheel load of the same wheel and of the longitudinal and lateral accelerations of the vehicle. On the other hand, this simplification provides a linear relationship between an acceleration (ax, ay) and the resulting change in the wheel load (LDFR, LDFL, LDRR, LDRL).

The total of eight model parameters c1FL to c2RL in this example can e.g. be determined empirically in advance and stored for the execution of the method, e.g. in an electronic control apparatus of the vehicle.

The model parameters c1FL to c2RL can be positive or negative in this context. Assuming a positive longitudinal acceleration (ax>0) will be defined in the direction of travel of the vehicle, and a positive lateral acceleration (ay>0) will be defined directed towards the left when considered in the direction of travel of the vehicle. In this definition, the model parameters c1FL to c2RL have the following signs: c1FL<0, c1FR<0, c1RR>0, c1RL>0, c2FL<0, c2FR>0, c2RR>0, c2RL<0.

If both the mass distribution of the the vehicle and the locations at which the four wheels are arranged are symmetrical with respect to a vertical longitudinal center plane of the vehicle, which often applies at least approximately, for reasons of symmetry it is found that some of these model parameters c1FL to c2RL are identical or identical in terms of absolute value, which correspondingly simplifies the model in terms of the number of independent model parameters: c1FL=c1FR, c1RR=c1RL, c2FL=−c2FR, c2RR=−c2RL.

Considered chronologically, the execution of the steps a1, a2, a3, b, c can be provided directly after the start of travel by the vehicle and therefore directly after a possible change in the static wheel loads for a certain time ("first phase"), wherein the specified steps can be carried out simultaneously to the effect that on the basis of a detection of a measured value tuple, carried out according to steps a1, a2, a3, composed of a deformation measured value, pressure measured value and acceleration measured value or values, the dynamic wheel load of the respective wheel can be calculated, as it were, immediately according to step b, and furthermore the static wheel load of this wheel can be calculated according to step c.

This first phase is preferably continued directly after start of travel at least until at least five measured value tuples, in particular at least 10 measured value tuples, and the corresponding number of calculated dynamic and static wheel loads have been determined for each wheel. This improves the statistical quality of the following step d.

In the step d, the dynamic wheel loads of the wheels calculated according to step b, and the static wheel loads of the wheels respectively calculated according to step c, and the acceleration measured value or values which are respectively detected according to step a3 are fed to a statistical analysis for the calculation of the at least one model parameter of the second model.

In this step d, the aim is therefore to find the model parameter or parameters (depending on the formulation of the second model), in such way that the second model complies in the best possible way with the previously calculated static and dynamic wheel loads and acceleration measured values respectively detected for them.

In step d there can be provision that from the multiplicity of static wheel loads which were previously calculated for each wheel, initially a single such static wheel load is defined for each wheel, e.g. as a mean value of the static wheel loads calculated for this wheel, and the at least one remaining model parameter is then calculated. However, alternatively, in step d it is possible also to provide a correction of the static wheel loads which are e.g. each defined as a mean value, or the static wheel loads could also be treated within the scope of the statistical analysis as parameters of the second model which are to be adapted, and the wheel loads could therefore be entirely recalculated.

Statistical methods suitable for this are known from the prior art, so that for the specific configuration of step d it is advantageously possible to have recourse to the prior art in this respect. Merely by way of example it is to be noted that for this it is possible to carry out e.g. a regression analysis based on least mean squares, in order to adapt the respective model parameters and if appropriate the static wheel loads to be defined per wheel to the actual measurement data (fit of the model parameters).

In one advantageous embodiment, step d, that is the calculation of the at least one model parameter, does not occur until the detected measured values from steps a1, a2, a3 and/or the calculated wheel loads from steps b and c satisfy a predetermined triggering criterion. In this way, the statistical quality of the result of the following step d can be improved.

A possible triggering criterion was already mentioned above, specifically the presence of a predetermined minimum number of detected measured values and wheel loads per wheel calculated on the basis thereof.

Alternatively or additionally, the triggering criterion can require, in particular, e.g. that at least one predetermined acceleration threshold value has been exceeded by the acceleration measured values detected according to step a3. In contrast to known methods, with the method according to the invention it is not disadvantageous e.g. in the stated first phase, according to steps a1 and a2, to detect measured values with relatively large absolute values of a vehicle acceleration and rather it is even advantageous for the result of the statistical analysis according to step d.

As an alternative to or in addition to the embodiment in which the calculation of the at least one model parameter (step d) does not occur until the detected measured values and/or the calculated wheel loads satisfy a predetermined triggering criterion, for the sake of a required statistical quality level of the model parameter calculation it is also possible to provide an embodiment in which the points in time of the detection operations of the deformation and pressure measured values which occur in steps a1 and a2 are specified as a function of a previously detected acceleration measured value. Therefore, it is possible to detect advantageously targeted, e.g. fewer, but statistically more valuable measured values in steps a1 and a2. For this purpose, it is possible to monitor continuously, e.g. during the above-mentioned first phase of the method, for which acceleration states of the vehicle measured values are still required, and therefore when a corresponding vehicle acceleration is detected targeted detection of measured values can be triggered according to steps a1 and a2. For example, a control apparatus of the vehicle which continuously receives acceleration measured values can, via a bidirectional communication link, selectively instruct electronic wheel units to detect such measured values for this.

Step d forms, as it were, a transition between the above-mentioned first phase and a second phase which requires the result of step d and is formed by steps e3 and f, and advantageously permits the dynamic wheel loads of the wheels to be calculated with high time resolution.

In step e3 it is possible to bring about the (renewed) detection of the at least one acceleration measured value precisely like the detection provided according to step a3. In this respect, reference is made to the relevant explanations regarding step a3.

In step f, the (renewed) calculation of the dynamic wheel loads can, in a certain way, be provided similarly to the calculation carried out in step c, e.g. carried out by means of the same, e.g. program-controlled, control apparatus. A first difference of step f with respect to step c is that in step f the dynamic wheel loads are calculated from previously calculated static wheel loads, and not vice versa. In other words, the second model on which both step c and step f are based are used, as it were, in different directions. A second difference is that in step f the model parameter or parameters contained in the second model is/are not the model parameters which are fixedly specified at the start of the method but rather the model parameter or parameters calculated in step d are used in step f. Furthermore, in step f it is possible to use static wheel loads which are assumed to be constant (calculated in step c or d).

In one embodiment, steps e3 and f ("second phase") can, for example, be carried out until a stationary state of the vehicle, preferably a stationary state over a specified minimum time period, is detected again, in order e.g. in the case of a subsequent renewed start of travel, to start the method according to the invention again with the first phase.

A particular significant advantage of the calculation of the dynamic wheel loads according to step f is that the respective acceleration measured value or values is/are generally easily available with relatively high time resolution so that according to step f the dynamic wheel loads can be calculated (estimated) with just such a high time resolution. In one embodiment, there can be provision e.g. that in step e3 the acceleration measured value or values is/are detected with a time interval of less than 1 sec, in particular less than 0.1 sec, in order to be able to calculate the dynamic wheel loads with a correspondingly high time resolution, e.g. in step f.

In the method according to the invention, steps e1 and e2 are, as already mentioned, merely optional. If these steps are carried out in conjunction with step e3, this generally means no additional expenditure, since apparatuses which are suitable for this are present in any case for steps a1 and a2, but has e.g. the advantage that an embodiment or a particular operating mode of the method according to mention is made possible in which during the explained second phase (steps e1, e2, e3, f) the same measurement data relating to the tire deformation and internal pressure of the tire as well as acceleration of the vehicle are additionally made available (in parallel) as in the above-mentioned first phase, so that e.g. in particular also even during a specific travel of the vehicle (e.g. from time to time) the steps b, c and d can be carried out once more. Therefore, e.g. even during travel an updated calculation of the static wheel loads of the wheels (step c) and an updated calculation of the model parameter or parameters (step d, if appropriate including a correction of the static wheel loads) can be made on the basis thereof. This advantageously also makes it possible to take into account better situations in which the static wheel loads change during travel, which is the case e.g. if vehicle occupants and/or cargo are shifted within the vehicle during travel.

Another reason or advantage relating to an updated (renewed) calculation of the static wheel loads and of the model parameters can consist in the fact that, in contrast to a one-off calculation (e.g. directly after the start of travel) which was performed e.g. after a relatively short time, e.g. a few minutes after the start of travel, the later, updated calculation can be provided on the basis of measurement data which are detected via a time period which is longer in comparison (e.g. more than 5 minutes, particular more than 10 minutes), which can correspondingly improve the statistical quality of the updated calculation results of steps c and d. During this relatively long time period, the dynamic wheel loads which are based on the first, original calculation (in steps c and d) can also be output with step f, wherein the re-calculation runs, as it were, in the background.

According to a further aspect of the invention, a device comprising means for carrying out such a method of the type described here is proposed. Such a device can have, in particular, e.g. the following components:

electronic wheel units which are provided for arrangement on in each case one of the wheels of the vehicle, e.g. arranged on an inner side of a tire tread of the respective tire, having means for detecting the deformation measured values, the pressure measured values and optionally the at least one acceleration measured value, a control apparatus having means for calculating the dynamic wheel loads, the static wheel loads and the at least one model parameter.

The embodiments described here for the method according to mention and particular configurations can also be correspondingly provided individually or in any desired combination as embodiments or particular configurations of the device according to the invention Therefore, the means, provided on the electronic wheel unit, for detecting the deformation measured values can have e.g. a suitable sensor, e.g. a radial acceleration sensor, a shock sensor, a deformation sensor etc. In order to detect the pressure measured values, each electronic wheel unit can be equipped with a pressure measuring sensor which is arranged within the tire. In order to detect the at least one acceleration measured value, the electronic wheel unit can be equipped with one or more acceleration sensors. Alternatively or additionally, the control apparatus has one or more acceleration sensors which are used for this or can be connected or is connected to such sensors.

The control apparatus is e.g. a central electronic control apparatus of the vehicle and preferably operates in a program-controlled fashion.

Each of the electronic wheel units can also have a program-controlled control apparatus by means of which sensor signals supplied directly by the above-mentioned sensors are subjected to evaluation and/or further processing.

In addition, each electronic wheel unit can have a radio transmitter in order to transmit measurement data and/or variables derived from measurement data, e.g. the dynamic wheel load, to the control apparatus by radio. If appropriate, a bidirectional radio link can also be provided between the electronic wheel units and the above-mentioned control apparatus of the vehicle.

According to a further aspect of the present invention, a computer program product is proposed having a program code which, when executed on a data processing device (e.g. in a control apparatus of the vehicle and/or in control apparatuses of the electronic wheel units), carries out a method of the type specified here.

Figure 2:
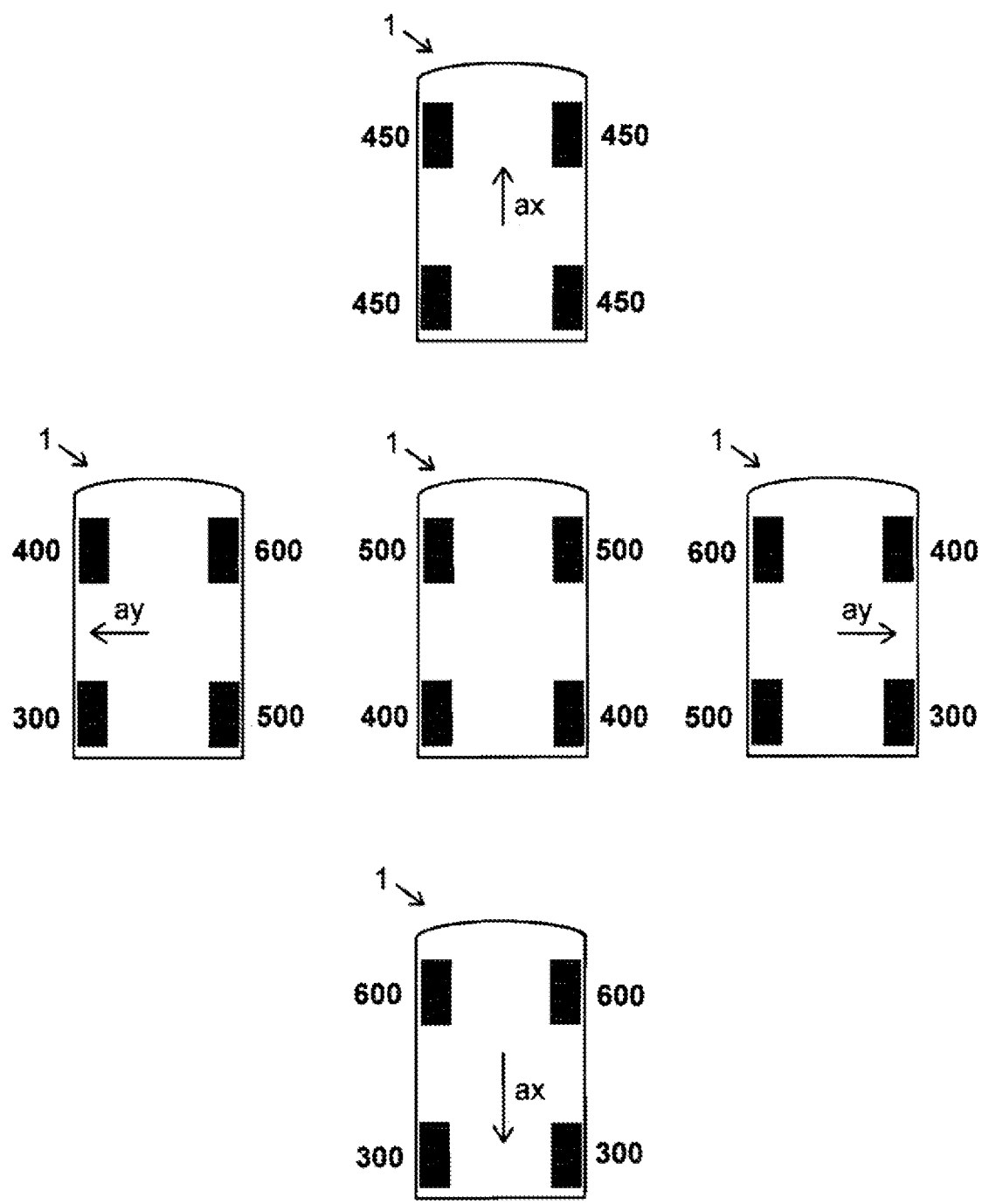
Figure 3:
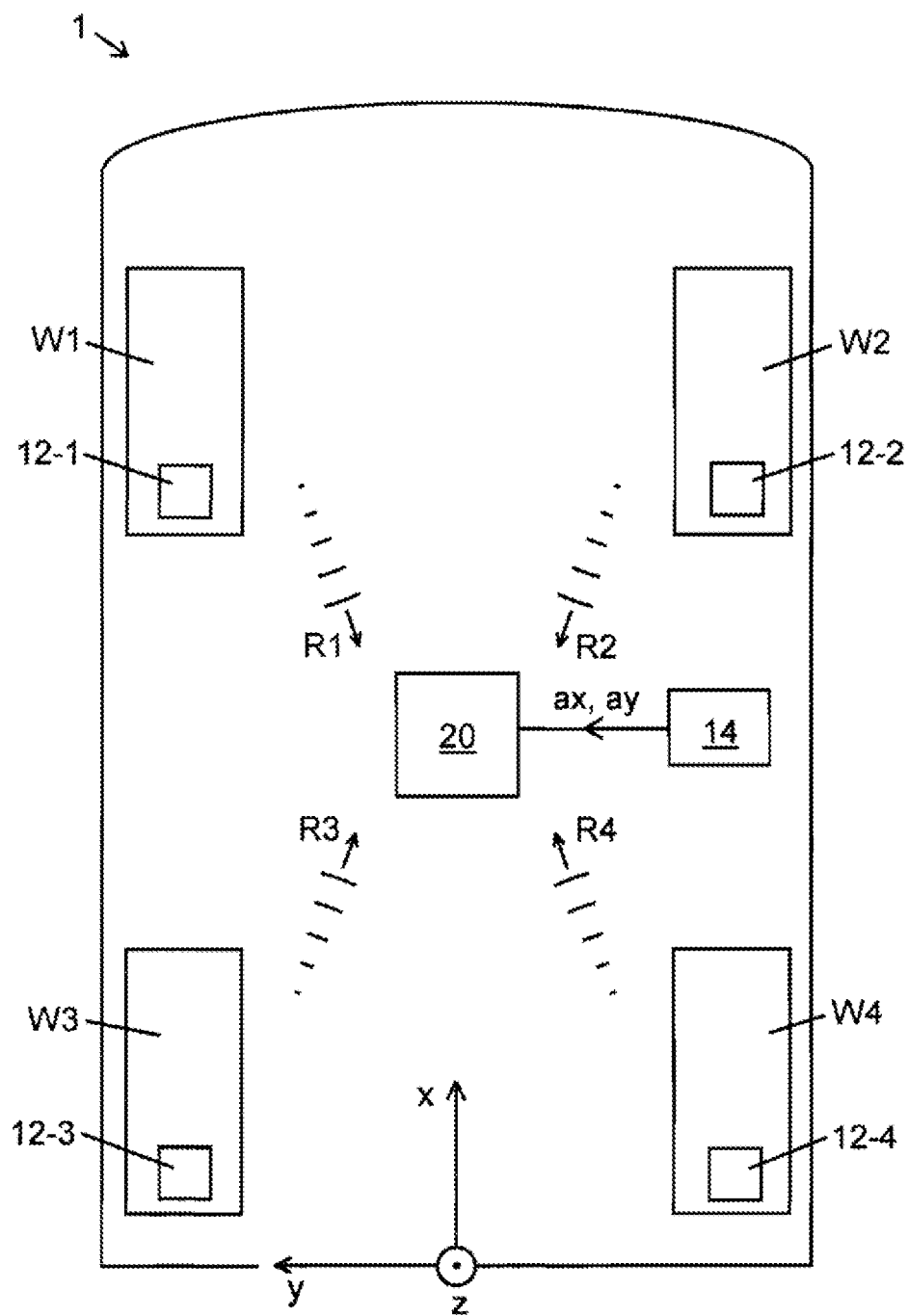
Figure 4:
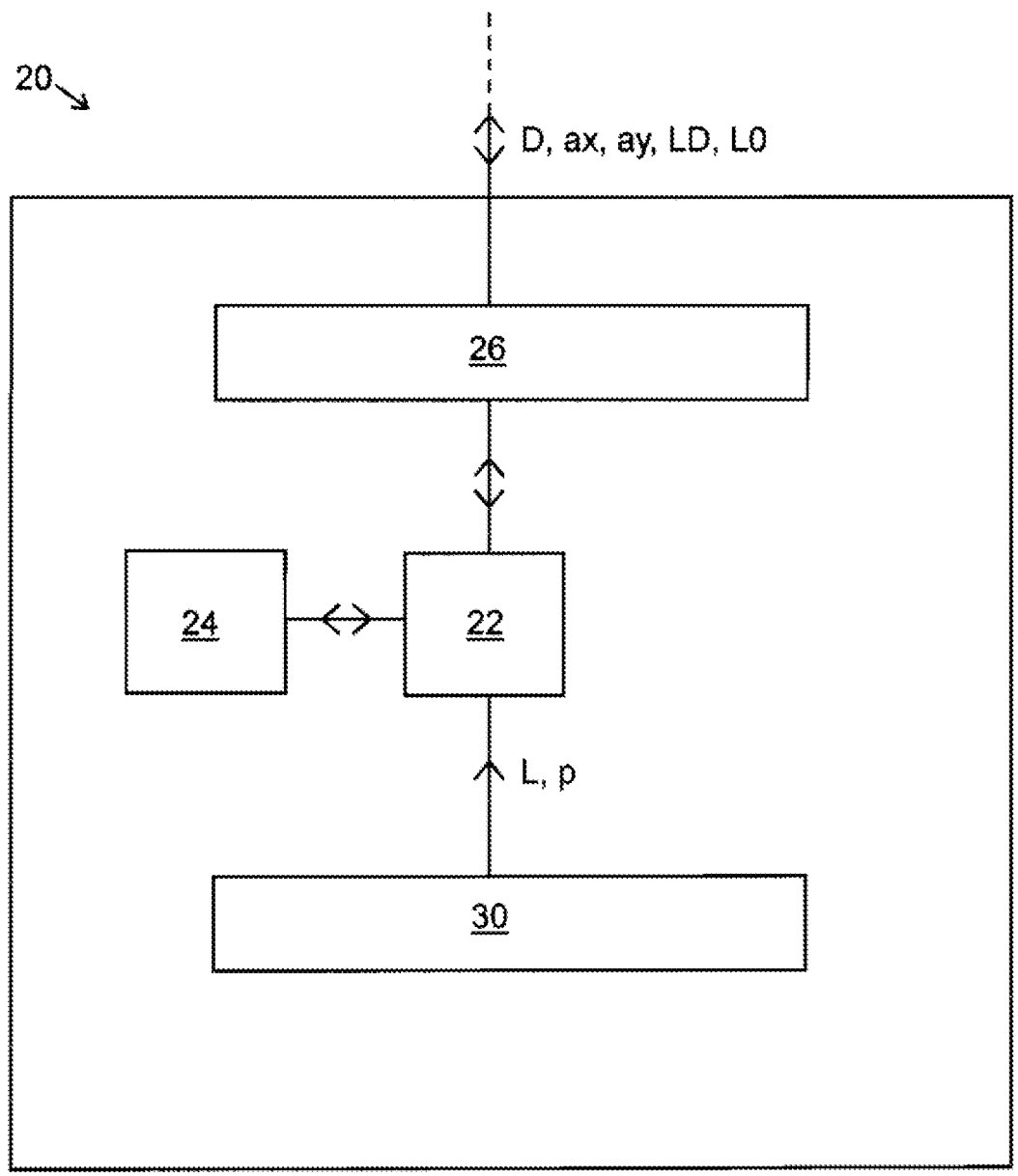

The invention is described in more detail below on the basis of exemplary embodiments with reference to the enclosed drawings, in which:

FIG. 1 shows a schematic flow diagram of a method for determining wheel loads on wheels of a vehicle, FIG. 2 shows a schematic illustration of a vehicle in the stationary state (FIG. 2, center) and in various acceleration states (FIG. 2, top, right, bottom and left), with illustration of a dynamic wheel load distribution in the various states, FIG. 3 shows a schematic plan view of the vehicle in FIG. 2 with a device for carrying out a method according to FIG. 1, and FIG. 4 shows a block diagram of a control apparatus which is used in the vehicle in FIG. 2 and in FIG. 3

FIG. 1 shows a simplified view of the sequence of a method for determining dynamic wheel loads on wheels W1-W4, which are each equipped with a tire, of a vehicle 1 illustrated in FIGS. 2 and 3, according to one embodiment.

In a step S1, measured values of the length of a tire contact patch (i.e. a length of a tire contact area) L of the respective tires are detected, and measured values of the internal pressure p of the respective tires are detected by means of electronic wheel units 12-1 to 12-4 which are arranged on the wheels W1-W4, and measured values of a longitudinal acceleration ax and a lateral acceleration ay of the vehicle 1 are detected by means of an acceleration-detection apparatus 14 which is provided for this on the vehicle 1.

These measured value detection operations begin after a start of travel of the vehicle 1 and are carried out here from time to time (typical time interval of approximately 10 sec), wherein the measured values L and p are transferred by radio (radio signals R1-R4) to a central electronic control apparatus 20 of the vehicle 1, and the measured values ax and ay are also transmitted to the control apparatus 20, e.g. via a digital data transmission bus.

Furthermore, in step S1 dynamic wheel loads LD of the respective wheels W1-W4 are calculated from the respective measured values L and p according to a first model which links these variables (e.g. LD=p×B×L, where B represents a width of the tire contact area which is assumed e.g. to be constant or alternatively to be dependent on L and/or p), and static wheel loads L0 of the wheels W1-W4 are calculated from the calculated dynamic wheel loads LD of the wheels W1-W4 and the measured values ax and ay according to a second model which links these variables (L0, LD, ax, ay) and contains at least one model parameter.

In the illustrated example, the second model is provided as follows:

$$LDFL = L0FL + c1FL \times ax + c2FL \times ay$$

$$LDFR = L0FR + c1FR \times ax + c2FR \times ay$$

$$LDRR = L0RR + c1RR \times ax + c2RR \times ay$$

$$LDRL = L0RL + c1RL \times ax + c2RL \times ay$$

where:
LDFL denotes the dynamic wheel load on the wheel W1
LDFL denotes the dynamic wheel load on the wheel W2
LDRR denotes the dynamic wheel load on the wheel W4
LDRL denotes the dynamic wheel load on the wheel W3
L0FL denotes the static wheel load on the wheel W1
L0FR denotes the static wheel load on the wheel W2
L0RR denotes the static wheel load on the wheel W4
L0RL denotes the static wheel load on the wheel W3
c1FL denotes a model parameter
c1FR denotes a model parameter
c1RR denotes a model parameter
c1RL denotes a model parameter
c2FL denotes a model parameter
c2FR denotes a model parameter
c2RR denotes a model parameter
c2RL denotes a model parameter For this calculation in step S1 the control apparatus 20 uses values of the model parameters c1FL to c2RL stored therein.

As result, step S1 supplies, with a certain clock rate (e.g. typically approximately every 10 sec) the respective dynamic wheel loads LD and the respective static wheel loads L0 for the respective wheels W1-W4. These wheel loads LD, L0 which are calculated in this first phase can advantageously be made available e.g. at comfort apparatuses and/or safety apparatuses of the vehicle 1, e.g. at anti-blocking systems of vehicles, at an electronic stability program etc.

The data which relates to the wheel loads LD, L0 and is produced during this first phase as well as the measured values ax, ay which are respectively detected for each of them are buffered by the control apparatus 20 and are also checked continuously, in step S1, for the satisfaction of a predetermined triggering criterion.

In the illustrated example, the triggering criterion requires e.g. that the detected measured values ax, ay have each exceeded a predetermined positive threshold value at least once and each undershot a predetermined negative threshold value at least once, and the absolute values of the therefore four threshold values can be e.g. identical. This triggering criterion which is to be understood as merely exemplary is accordingly satisfied e.g. when the vehicle 1 has passed through at least one (positive) acceleration process, at least one braking process, at least one left-handed cornering process and at least one right-handed cornering process of a respectively predetermined minimum magnitude.

As soon as these triggering criteria are satisfied, the processing proceeds to a step S2.

In step S2, the model parameters c1FL to c2RL of the second model, specified above, are calculated as a result of a statistical analysis of the wheel loads LD, L0 calculated in step S1 and the measured values ax, ay which are respectively detected in step S1.

In the illustrated example, the statistical analysis is provided as a regression analysis by means of which the model parameters c1FL to c2RL of the second model are adapted to the measured values obtained in step S1. In this example, mean values of the static wheel loads which are respectively obtained for one of the wheels W1-W4 by the calculation in step S1 are used as the static wheel loads L0. Alternatively, the static wheel loads L0 could also be subjected to adaptation by means of the statistical analysis.

The processing then continues to step S3.

In step S3, renewed detection of the measured values ax, ay takes place with a relatively high time resolution, i.e. for example with time intervals of at maximum 0.1 sec, preferably at maximum 0.01 sec. This detection is also carried out by means of the acceleration detection apparatus 14.

In the step S3, renewed calculation of the dynamic wheel loads LD takes place from the static wheel loads L0 calculated at the end of the step S1 and, if appropriate, corrected in step S2, and the newly detected acceleration measured values ax, ay according to the second model, wherein the model parameters c1FL to c2RL calculated in step S2 are used in step S3.

As result, step S3 therefore supplies the dynamic wheel loads LD of the wheels W1-W4 with an advantageously high time resolution corresponding to the time resolution (e.g. 10 ms) of the renewed detection of the measured values ax, ay.

It is to be noted that the renewed detection of the measured values ax, ay which is provided in step S3 can in principle also simply constitute a continuation of the detection of the measured values ax, ay which is provided in step S1 or the first phase, and that in step S3 renewed detection of measured values L, p can optionally also be provided, likewise in principle as continued detection of the detection in step S1. The latter, i.e. the detection of the measured values L, p which takes place in the second phase advantageously makes it possible that in the step S3 the steps S1 and S2 are, as it were, additionally repeated in parallel on the basis of the newly detected measured values, in order e.g. to perform an updated calculation of the static wheel loads L0 and an updated calculation of the model parameters c1FL to c2RL even while the vehicle 1 is traveling, for example in order to increase the accuracy of the values of the dynamic wheel loads LD which are supplied in step S3

FIG. 2 illustrates, using the example of the vehicle 1 with the four wheels W1-W4 (cf. FIG. 3), here e.g. a passenger car, dynamic wheel loads (LD) as a function of driving operating states of the vehicle 1 which are assumed by way of example in FIG. 2.

The numeric values illustrated in FIG. 2 each specify the dynamic wheel loads LD (in kg) of a respective wheel.

In the partial illustration in FIG. 2, center, it is assumed that the vehicle 1 is in the stationary state or is moving in an unaccelerated fashion. As illustrated in FIG. 2, in this state the wheel loads L are 500 kg at each of the two front wheels W1, W2 and 400 kg at each of the two rear wheels W3, W4. These dynamic wheel loads LD correspond to the static wheel loads L0 of the vehicle 1.

In the partial illustration in FIG. 2, top, it is assumed that the vehicle 1 is accelerating (ax>0). In this state, the wheel loads LD are respectively reduced at the two front wheels, and respectively increased at the two rear wheels W3, W4, c.f. the numerical values in FIG. 2, top.

In the partial illustration in FIG. 2, bottom, it is assumed that the vehicle 1 is decelerating or braking (ax<0). In this state, the wheel loads LD are respectively increased at the two front wheels, and respectively reduced at the two rear wheels W3, W4, c.f. the numerical values in FIG. 2, bottom.

In the partial illustration in FIG. 2, top, it is assumed that the vehicle 1 is driving along a left-hand curve (ay>0). In this state, the wheel loads LD are respectively reduced at the two left wheels, and respectively increased at the two right wheels W2, W4, c.f. the numerical values in FIG. 2, left.

In the partial illustration in FIG. 2, right, it is assumed that the vehicle 1 is driving along a right-hand curve (ay<0). In this state, the wheel loads LD are respectively increased at the two left wheels W1, W3, and respectively reduced at the two right wheels W2, W4, c.f. the numerical values in FIG. 2, right.

FIG. 3 shows the vehicle 1 or the device thereof for carrying out the described method in more detail. The components indicated for the device, that is to say electronic wheel units 12-1 to 12-4 which are respectively arranged on one of the wheels W1-W4 and have the respective means for detecting the measured values L and p, and the vehicle-side control apparatus 20 which has the means for carrying out the explained calculation of the dynamic wheel loads LD, the static wheel loads L0 and the model parameters c1FL to c2RL, have already been explained above in respect of their method of functioning within the scope of the invention.

FIG. 4 shows the control apparatus 20 of the vehicle 1 in FIG. 3 in more detail.

The control apparatus 20 is embodied as a program-controlled central control apparatus of the vehicle 1 and has for this a computer apparatus 22 and an associated memory apparatus 24 in which e.g. software which controls the operation of the computer apparatus 22 is stored.

In addition, the first and second modules which are used according to the invention are also stored in the memory apparatus 24. Finally, the memory apparatus 24 can be used to buffer the measured values determined in steps S1 and S3 during the method, and to store the static wheel loads L0 calculated after the conclusion of step S1 and the model parameters c1FL to c2RL calculated in step S2 (at least up to a re-calculation of these variables or parameters).

The control apparatus 20 also has a radio receiver apparatus 30 by means of which the radio signals R1 to R4, which are transmitted by the electronic wheel units 12-1 to 12-4 and which form data signals in the example illustrated, are received.

The control apparatus 20 also has an interface apparatus 26 via which it is connected to a digital communication bus, e.g. a CAN bus or the like, of the vehicle 1, in order to obtain, in the illustrated example, in particular the measured values ax and ay from the acceleration detection apparatus 14, and to exchange other data D with further components of the vehicle 1 which are connected to the respective communication bus. These data D can contain e.g. the wheel loads LD, L0 calculated in the course of the method according to the invention.

With the electronic wheel units 12-1 to 12-4 it is advantageously possible to implement, in conjunction with the control apparatus 20, not only the device for determining the dynamic wheel loads LD and the static wheel loads L0 but also what is referred to as a tire pressure-monitoring system (TPMS) which, e.g. in the case of an abrupt loss of pressure in one of the tires, can output a corresponding warning message to e.g. a driver of the vehicle 1 via the interface apparatus 26.

LIST OF REFERENCE SIGNS

1 Vehicle
W1 to W4 Vehicle wheels
12-1 to 12-4 Electronic wheel units
14 Acceleration detection apparatus
20 Control apparatus
22 Computer apparatus
24 Memory apparatus
26 Interface apparatus
30 Radio receiver apparatus
LD Dynamic wheel load
L0 Static wheel load
L Length of the tire contact area
B Width of the tire contact area
P Internal pressure of the tire
R1 to R4 Radio signals
ax Longitudinal acceleration of the vehicle
ay Lateral acceleration of the vehicle
D Data

The invention claimed is:

1. A method for determining wheel loads on wheels, which are each equipped with a tire, of a vehicle, comprising the steps of:
 a1) detecting deformation measured values representative of a deformation of the respective tire,
 a2) detecting pressure measured values representative of an internal pressure of the respective tire,
 a3) detecting at least one acceleration measured value representative of an acceleration of the vehicle,
 b) calculating dynamic wheel loads of the respective wheels from the respective detected deformation measured value and the respective detected pressure measured value according to a first model which links the respective detected deformation measured value and the respective detected pressure measured value, wherein the dynamic wheel load of the wheel represents the wheel load actually acting on this wheel,
 c) calculating static wheel loads of the wheels from the calculated dynamic wheel loads of the wheels and the at least one detected acceleration measured value according to a second model which links the calculated dynamic wheel loads of the wheels and the at least one detected acceleration measured value and comprises at least one model parameter, wherein the static wheel load of a wheel represents the wheel load acting on this wheel when the vehicle is not accelerated,
 d) calculating the at least one model parameter of the second model as a result of a statistical analysis of the calculated dynamic wheel loads of the wheels, of the respectively calculated static wheel loads of the wheels, and of the respectively detected at least one acceleration measured value,
 e3) redetecting at least one acceleration measured value which is representative of acceleration of the vehicle,
 f) recalculating the dynamic wheel loads of the wheels from the previously calculated static wheel loads of the wheels and the at least one redetected acceleration measured value according to the second model, wherein the previously calculated at least one model parameter of the second model is used;
 wherein the steps are carried out at a device comprising:
  an electronic wheel unit configured to be arranged on one of the wheels of the vehicle, the electronic wheel unit configured to detect the deformation measured values, the pressure measured values, and
  a control apparatus configured to calculate the dynamic wheel loads, the static wheel loads and the at least one model parameter.

2. The method as claimed in claim 1, wherein the deformation measured values are each representative of a length of a tire contact area of the respective tire.

3. The method as claimed in claim 1, wherein the at least one acceleration measured value has a longitudinal acceleration measured value which is representative of a longitudinal acceleration of the vehicle.

4. The method as claimed in claim 1, wherein the at least one acceleration measured value has a lateral acceleration measured value which is representative of a lateral acceleration of the vehicle.

5. The method as claimed in claim 1, wherein the method is carried out in a vehicle with four wheels, and the second model is provided as follows:

$$LDFL = L0FL + c1FL \times ax + c2FL \times ay$$

$$LDFR = L0FR + c1FR \times ax + c2FR \times ay$$

$$LDRR = L0RR + c1RR \times ax + c2RR \times ay$$

$$LDRL = L0RL + c1RL \times ax + c2RL \times ay$$

where:
LDFL denotes the dynamic wheel load on the front left wheel
LDFR denotes the dynamic wheel load on the front right wheel
LDRR denotes the dynamic wheel load on the rear right wheel
LDRL denotes the dynamic wheel load on the rear left wheel
L0FL denotes the static wheel load on the front left wheel
L0FR denotes the static wheel load on the front right wheel
L0RR denotes the static wheel load on the rear right wheel
L0RL denotes the static wheel load on the rear left wheel
c1FL denotes a model parameter
c1FR denotes a model parameter
c1RR denotes a model parameter
c1RL denotes a model parameter
c2FL denotes a model parameter
c2FR denotes a model parameter
c2RR denotes a model parameter
c2RL denotes a model parameter
ax denotes the longitudinal acceleration of the vehicle
ay denotes the lateral acceleration of the vehicle.

6. The method as claimed in claim 1, wherein the calculation of the at least one model parameter does not occur until at least one of the detected measured values and the calculated wheel loads satisfy a predetermined triggering criterion.

7. The method as claimed in claim 1, wherein points in time of the detection operations of the deformation measured values and pressure measured values carried out in steps a1) and a2) are specified as a function of a detected acceleration measured value.

8. The method as claimed in claim 1, wherein the renewed calculation of the dynamic wheel loads is carried out with a time resolution of at maximum 0.5 s.

9. A device for carrying out a method comprising the steps of:
- a1) detecting deformation measured values representative of a deformation of the respective tire,
- a2) detecting pressure measured values representative of an internal pressure of the respective tire,
- a3) detecting at least one acceleration measured value representative of an acceleration of the vehicle,
- b) calculating dynamic wheel loads of the respective wheels from the respective detected deformation measured value and the respective detected pressure measured value according to a first model which links the respective detected deformation measured value and the respective detected pressure measured value, wherein the dynamic wheel load of the wheel represents the wheel load actually acting on this wheel,
- c) calculating static wheel loads of the wheels from the calculated dynamic wheel loads of the wheels and the at least one detected acceleration measured value according to a second model which links the calculated dynamic wheel loads of the wheels and the at least one detected acceleration measured value and comprises at least one model parameter, wherein the static wheel load of a wheel represents the wheel load acting on this wheel when the vehicle is not accelerated,
- d) calculating the at least one model parameter of the second model as a result of a statistical analysis of the calculated dynamic wheel loads of the wheels, of the respectively calculated static wheel loads of the wheels, and of the respectively detected at least one acceleration measured value,
- e3) redetecting at least one acceleration measured value which is representative of acceleration of the vehicle,
- f) recalculating the dynamic wheel loads of the wheels from the previously calculated static wheel loads of the wheels and the at least one redetected acceleration measured value according to the second model, wherein the previously calculated at least one model parameter of the second model is used, the device comprising:
- electronic wheel units configured to be arranged on in each case one of the wheels of the vehicle, the electronic wheel units configured to detect the deformation measured values, the pressure measured values, and
- a control apparatus configured to calculate the dynamic wheel loads, the static wheel loads and the at least one model parameter.

10. A non-transitory computer readable medium containing program code for determining wheel loads on wheels that, when executed on a data processing apparatus, performs the method as claimed in claim 1.

11. The method as claimed in claim 1, further comprising:
- e1) redetecting deformation measured values which are representative of a deformation of the respective tire.

12. The method as claimed in claim 1, further comprising:
- e2) redetecting pressure measured values which are representative of an internal pressure of the respective tire.

13. The method as claimed in claim 1, further comprising:
- e1) redetecting deformation measured values which are representative of a deformation of the respective tire, and
- e2) redetecting pressure measured values which are representative of an internal pressure of the respective tire.

14. The method as claimed in claim 8, wherein the renewed calculation of the dynamic wheel loads is carried out with a time resolution of at maximum 0.1 s.

15. The device as claimed in claim 9, wherein the electronic wheel units are configured to detect the at least one acceleration measured value.

* * * * *